US008991698B2

(12) United States Patent
Tung

(10) Patent No.: US 8,991,698 B2
(45) Date of Patent: Mar. 31, 2015

(54) METHOD FOR QUICK CONNECTION WITH NETWORK DEVICE AND CONTROLLER

(71) Applicant: Zeon Corporation, Taipei (TW)

(72) Inventor: Tien Chun Tung, Taipei (TW)

(73) Assignee: Zeon Corporation, Taipei (TW)

( * ) Notice: Subject to any disclaimer, the term of this patent is extended or adjusted under 35 U.S.C. 154(b) by 162 days.

(21) Appl. No.: 13/922,810

(22) Filed: Jun. 20, 2013

(65) Prior Publication Data

US 2013/0341396 A1 Dec. 26, 2013

(30) Foreign Application Priority Data

Jun. 21, 2012 (CN) .......................... 2012 1 0207974

(51) Int. Cl.
*H04L 12/28* (2006.01)
*G06F 13/14* (2006.01)

(52) U.S. Cl.
CPC ...................................... *G06F 13/14* (2013.01)
USPC ................ 235/382; 370/254; 709/245; 726/3

(58) Field of Classification Search
USPC ................ 235/382; 370/254; 709/245; 726/3
See application file for complete search history.

(56) References Cited

U.S. PATENT DOCUMENTS

2005/0138205 A1* 6/2005 Naismith ...................... 709/245
2006/0000910 A1* 1/2006 Chong et al. ............. 235/462.15
2009/0055897 A1* 2/2009 Morgan et al. .................... 726/3
2012/0287219 A1* 11/2012 Ravi et al. .................. 348/14.02
2014/0056171 A1* 2/2014 Clegg ............................ 370/254

* cited by examiner

*Primary Examiner* — Daniel Hess
(74) *Attorney, Agent, or Firm* — Chun-Ming Shih

(57) ABSTRACT

A method for quick connection with a network device and a controller are provided to connect the controller and the network device through a communication platform. The controller may select at least a login Account ID desired to generate a barcode pattern from the recorded login Account IDs of at least one of the network device for generating the barcode pattern corresponding to the selected at least login Account ID. Another controller may interpret the login Account ID of the network device by the barcode pattern and find out the identification information corresponding to the network device in the communication platform and perform connection.

19 Claims, 4 Drawing Sheets

METHOD FOR QUICK CONNECTION WITH NETWORK DEVICE AND CONTROLLER

CROSS-REFERENCE TO RELATED APPLICATIONS

This application claims the priority of China Patent Application No. 201210207974.8 filed on Jun. 21, 2012, in the State Intellectual Property Office of the P.R.C., the disclosure of which is incorporated herein by reference.

BACKGROUND OF THE INVENTION

1. Field of the Invention

The invention relates to a technology of quick connection with network devices, particularly to a method using barcode scan to input a login Account ID to connect quickly with network devices and a controller.

2. Descriptions of the Related Art

Conventionally, as a network device without I/O (Input/Output) interface set or controlled, for example, router, network printer, network camera, a user has to use another controller with I/O interface, for example, computer, smart phone, to enter an IP address that is desired or is default in the device to be controlled on the controller. In the next event, the user has to spend a long time in entering much connection information with respect to the network device, such as IP address, login IP address, login Account ID, login password and etc., such that the network device may be connected to a server to be logged in for the fulfillment of network services desired to be provided; if the network device is in a local area network behind a router, the user has to further set the router to permit the network connection between the network device and the controller; besides, the user has to possess a basic knowledge of networking which is too complex and difficult to average users, as stated above.

For example, a building management firm has to arrange multiple network cameras in doors, elevators, ladder spaces of some important floors etc. for the community building. Further, the contents recorded by the network cameras are sent to a specific multimedia storage device for access and recording of all contents sent from the network cameras. However, before using the multimedia storage device to access the contents recorded by remote network cameras, it is necessary to perform the complex internet connection procedure described aforementioned and set a login communication platform for all network cameras to be able to connect to internet, and for the multimedia storage device to accept the service request from the network camera and provide corresponding service, and it is pretty inconvenient. Also, in general, it is inconvenient in management because different login Account IDs/passwords have to be applied for different network cameras.

Besides, after the above network device logs in to the server successfully with registered login Account ID, the owner or the administrator having administration authority of the network device may sometimes want to share the access authority of the network device with his/her relatives and/or friends. However, those relatives and/or friends have still to enter the login information, such as login Account ID, password etc., of the network device step by step, and it is pretty inconvenient for connection operation of the network device.

SUMMARY OF THE INVENTION

In view of the problem of above conventional technologies, one purpose of the invention is to provide a method for quick connection with a network device and a controller to simplify the procedure having to enter login information when connecting with a network device.

To achieve the above goal, the invention provides a method for quick connection with network device, which connect a controller and the network device through a communication platform, and the communication platform records controller identification information and network device identification information for controller and network device that log in successfully, the controller identification information includes login Account ID for logging in to the communication platform, APP ID and IP connection method of control application installed and executed on the controller, the network device identification information includes login Account ID for logging to the communication platform, APP ID and IP connection method of function application installed and executed on the network device, the method for quick connection with network device includes the following procedure: control application of controller selects at least one login Account ID for generating barcode pattern from the recorded login Account ID of at least one of the network devices to generate barcode pattern corresponding to the selected at least one login Account ID; control application of another controller scans the generated barcode pattern, for the control application of the another controller to interpret login Account ID of network device to be connected; the control application of the another controller searches for corresponding identification information of network device with the interpreted login Account ID of the network device from the communication platform; the communication platform replies the another controller with the IP connection method of the network device to be connected according to the found out identification information of the network device; and the another controller connects with the network device desired to be connected according to the IP connection method replied by the communication platform.

Further, the invention provides a controller, which connects to at least one network device that is configured as a service unit of a communication platform through the communication platform, for the controller to interact with the at least one network device, the network device has one function application module, the communication platform stores, for the network device that has logged in successfully, network device identification information, inclusive of login Account ID thereof, APP ID of the function application module and IP connection method thereof, the controller includes: a communication, which is used to connect with the network device and/or communication platform; and a control application module, which is used to output login Account ID/password used to log in to the communication platform through the communication module, and performs control process for the network device after connecting with the network device, and records the login Account ID used or the network device that has performed control process, and provides selection for recorded login Account IDs of the network devices, and generates barcode pattern corresponding to the login Account ID of the selected network device.

For the above controller, the control application module has further a function of scanning barcode pattern to interpret login Account ID of the network device representing the barcode pattern, and search for network device identification information corresponding to the login Account ID in the communication platform, to perform connection with IP connection method of the network device acquired by the network device identification information that is found out.

The barcode pattern generated by the controller is displayed on local screen, stored in local storage unit, printed out, uploaded to cloud, or sent to external storage unit by the controller to provide for another controller to access or scan directly, to thereby interpret the login Account ID of the network device corresponding to the barcode pattern, such hat it avoid the inconvenience that a client desiring to connect has to enter a series messages for login.

In summary, for the method for quick connection with network device and the controller of the invention, the client selects from login Account IDs and/or APP Resources of one or more network devices recorded on a controller, and tap an execution key on the controller, the control application then provides the login Account ID selected by the client and/or the barcode pattern generated from the APP Resource to another controller for the user thereof to scan, such that the another controller may connect with the network device directly without entering a series of messages for login manually to simplify input program. The invention may provide convenient input operation for clients that are not familiar with input operation. Therefore, it overcomes the rejection of people on connection operation of network devices.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
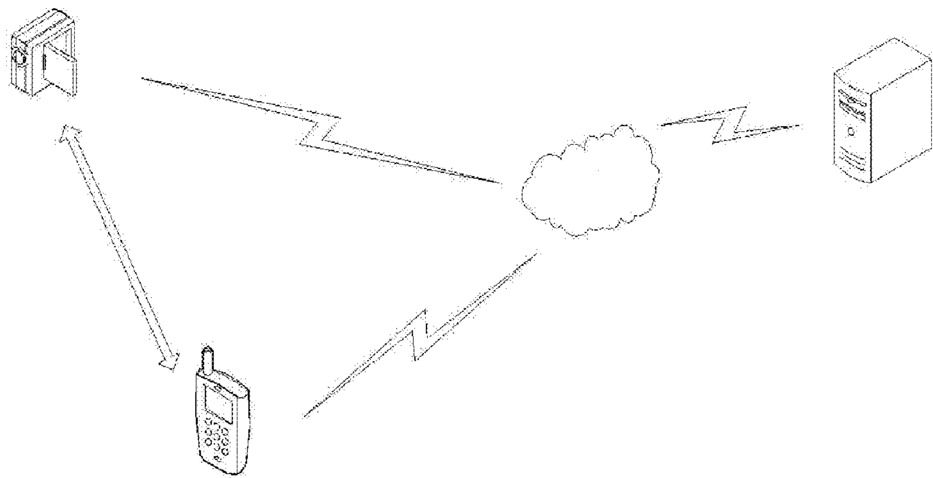
FIG. 1 is a schematic view showing a system architecture of a method for quick connection with a network device according to the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The invention provides a method for quick connection with a network device by using a controller to store a login Account ID and/or APP Resource for the controller to generate and display, on a screen of the controller, a barcode pattern, for example, one dimensional barcode or two dimensional barcode, corresponding to the login Account ID and/or the APP Resource according to the login Account ID and/or the APP Resource. In a preferred embodiment, the barcode pattern may be a QR code (Quick Response Code) for other controller to scan the barcode pattern and interpret the login Account ID and/or APP Resource, followed by connecting with the network device automatically. More particularly, a client of the controller may further download multiple barcode patterns generated by a remote device, and select the barcode pattern corresponding to the network device desired to be connected from the multiple barcode patterns for quick and convenient connection with the network device desired to be controlled.

We know that a communication platform 14 that provides connection service for the controller and the network device may have multiple service or configuration unit types. To ease recognition and management, the communication platform will record APP IDs of all legal units. The so called "APP IDs" indicate the application identifiers (application IDs) planned and designated integrally in advance by an administrator of the communication platform for applications executed by each legal unit logging in and running on the communication platform. Therefore, all legal applications know their own APP IDs and APP IDs of other applications to be interacted and operated. For example, the APP ID of a network camera (that is, the APP identifier of the network camera) is designated to be 400, while the APP ID of the controller managing the network camera is designated to be 500. Units login to the communication platform with login Account IDs and APP IDs in order to locate with each other. For example, as what the network device an user desires to manage is a specific network camera, the user logs in to the communication platform with his/her own login Account ID "B" through the controller (having an APP ID as 500) of the network camera in advance, followed by entering the login Account ID "A" of the network camera desired to be controlled through the controller, the application running on the controller will search an unit with login Account ID as "A" and APP ID as "400" through the communication platform, and thereby locate the network camera with login Account ID as "A" and APP ID as "400" for the controller to acquire the IP connection method of the network camera on the communication platform and connect with the network camera such that the controller may control the network camera. Therefore, network devices with different functions are classified with different APP IDs (that is APP identifiers). Hence, as for the communication platform, at least the login Account ID and the APP ID of the network device are recorded for each device network that logs in to the communication platform. In addition, the object to be located by the APP ID 500 is APP ID 400 in default for the program content in the application (with APP ID 500) of the aforementioned controller, the program content in the application of the network camera may also declares in advance that only the service request asked by the APP ID 500 will be accepted. Briefly, the APP ID in the application running on each unit is designated by the administrator of the communication platform in advance, such that different or the same applications of different units may search for IP connection methods with each other with login Account IDs and APP IDs of login units through the communication platform to connect with each other and work integrally.

Next, refer to FIG. 1, it is a schematic view showing a system architecture of a method for quick connection with a network device according to the invention. The aforementioned network camera adopts the network camera 10 as an example for description, and the aforementioned controller will adopts a smart phone 16 as an example for description in the following example. Nevertheless, the controller is not limited to the smart phone, but may be any electronic device having I/O interface, for example, computer. Generally speaking, once the network camera 10 is delivered from the plant, all setting information such as network parameters have not yet been set. In such situation, the network camera 10 cannot connect to internet 12 or the login communication platform 14. The smart phone 16 having the I/O interface may be used to set, for example, networking login, for the network camera 10. To simplify the setting procedure, the invention may set up a wireless network connection for the network camera 10 and the smart phone 16 by a wireless local area network function in advance. The wireless local area network function may be, for example, the Wi-Fi technology based on IEEE 802.11 standard. In other words, the network camera 10 may be a Wi-Fi device. Thereby, the smart phone 16 finds out the network camera 10 through the wireless function quickly and sets internet connection information an login Account ID/password parameters for the network camera 10.

From above, the communication platform 14 recognizes at least with the login Account ID and the APP ID of the network device for the network device login. Therefore the controller has to install and execute a control application, while the network device has to install and execute function application. After the controller and the network device have logged in the communication platform 14, both of them communicate and operate by using the login Account ID and the APP ID of the other side to find out the IP connection method of the other side on the communication platform through the installed control application and function application, respectively. As shown in FIG. 1, once the network camera 10 connects with the smart phone 16 through the communication platform, the control application installed and executed on the smart phone 16 may perform, for example, notification setting of image event, for the network camera 10, while the function application installed and executed on the network camera 10 stores the setting result of the smart phone 16 such that the smart phone 16 may be notified whenever specific events are detected subsequently, for example, recorded suspicious image.

Figure 2:
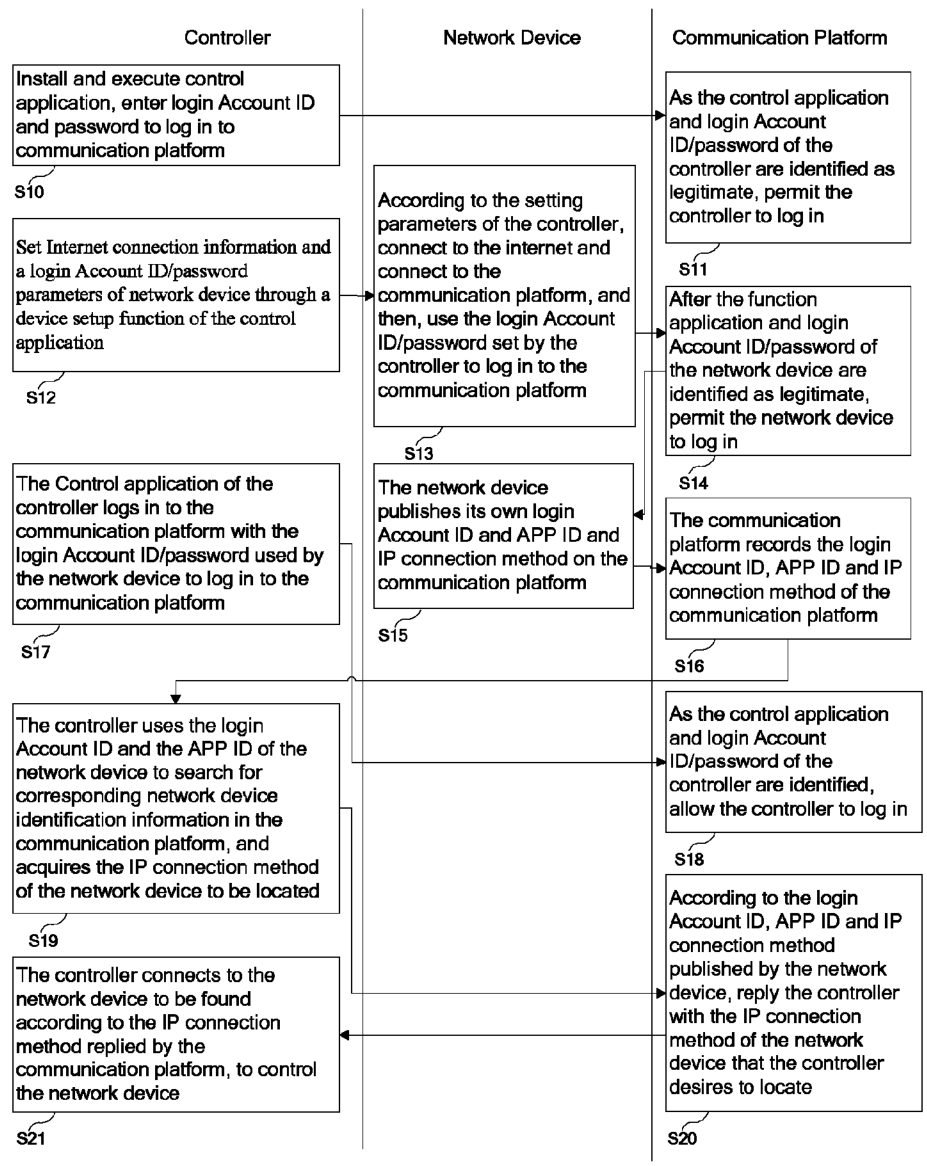
FIG. 2 is a process flow chart showing that how a network device becomes a legal unit in a communication platform.

Refer to FIG. 2, it is a process flow chart showing how a network device becomes a legal unit in a communication platform. To achieve the purpose of the invention for quick connection with network device, the network device has to log in successfully to the communication platform and become one unit of the communication platform. At first, step S10 is performed, the user enters the login Account ID and password through the controller with the control application installed and executed to perform the login to the communication platform, followed by performing step S11.

In step S11, the login of the controller is allowed as the communication platform assures the legitimacy of the control application and login Account ID/password of the controller, followed by performing step S12. What to be highlighted is that, the communication platform records registration messages including at least the login account ID and password for the controller and the network device that are registered successfully such that the communication platform may determine the login legitimacy.

In the step S12, the user selects a device setup function on the control application to set internet connection information and login Account ID/password parameters for the connected network device, followed by performing step S13. Here, the so called connection may be wireless or wired method. For example, once the user selects the "Setting New Device" function on the control application, the controller actuates wireless function to search for wireless SSID (Service Set Identifier) of a network device with default naming, while at the same time, the network device should also actuate the wireless function to announce a message, for example, hardware identifier that may be used to recognize the identity of the network device, for the controller to search for the SSID with the message as default naming method and wait for the connection with the controller. Therefore, the wireless SSID of the connection method between the network device and the controller depending on the architecture resources therebetween. On the other hand, as stated above, the network device should also actuate the wireless function and announce a message, for example, hardware identifier for its identity to be recognized, for the controller to search for the SSID with the message as the default naming method and wait for the connection with the controller. However, instead of wireless connection, wired connection is available. In other words, it depends on the architecture resources between the network device and the controller. Further, there are many default naming methods for the aforementioned SSID, those default naming methods are generally composed of APP IDs and hardware identifiers (but not limited thereto), for example, "gcam__2D3415A97B92", wherein "gcam" indicates the APP ID of the network device, and "2D3415A97B92" is the MAC address of the network card of the network device. The user may recognize the network camera (cam) once "gcam" is seen. The MAC address is generally printed on the housing of a network device or printed in the attached user operation manual file for the user to identify which network device is to be set when the user has to set the network device if there are many network devices at the same time.

In the step S13, after the network device receives the setting parameters transmitted from the controller, the internet connection information in the setting parameters is used to connect to the communication platform, followed by processing the login to the communication platform with the login Account ID/password set by the controller, and performing step S14.

In the step S14, the communication platform receives the login request from the network device and starts to identify the legitimacy of the function application of the network device, and the login Account ID/password, and allows the network device to log in once the legality is identified, followed by performing step S15. In addition, for the purpose of managing network devices that login to the communication platform effectively and securely, the communication platform may record multiple network device identifiers with legal authorization in order for the communication to verify the login network devices whether the network devices have been authorized. The aforementioned identifiers may be hardware identifiers or product serial numbers, including any identifier that may be used to identify the uniqueness of the network device. Generally, before commercial behavior of the network device such as delivery from the plant and sale, the commercial behavior executor provides the network device identifier to the administrator of the communication platform for the administrator to record the identifier of the network device on the communication platform. The identifier is used to check the legality of the network device. Therefore, it may prevent unauthorized network devices from logging in to the communication platform arbitrarily. The identification of the legality for the network device done by the communication platform is not limited to the identification of the function application of the network device, and the login Account ID/password, it also includes the identification of legality for the identifier of aforementioned network device uniqueness. The identifier of network device uniqueness is provided to the communication platform actively by the function application on the network device. In other words, it depends on the service requirement between the communication platform and the network device vendor. Thereby, the network devices that log in to the communication platform are controlled and managed effectively, and it prevents unauthorized network devices from using illegally services provided by the communication platform.

In the step S15, after the network device is identified as legal by the communication platform, the network device logs in successfully to the communication platform, and may announce login Account ID and APP ID and IP connection method of the network device on the communication platform to complete the configuration task for new devices, followed by performing step S16.

In the step 16, the communication records login Account ID, APP ID and IP connection method of the network device, followed by performing step S17. The communication platform stores identification information of the network device that have successful configuration and login through the login Account ID of the network device, the APP ID of the network device, and its IP connection method for the controller that logs in subsequently to search for the IP connection method of the network device desired to be located according to the login Account ID/APP ID to connect with the network device and perform control setting task, as stated in detail below.

In the step S17, the device administrator processes the login to the communication platform with the login Account ID/password that the aforementioned network device uses to log in to the communication platform through the control application of the controller, followed by performing step S18. It should be noted that if the controller that desires to log in to the communication platform uses the same login Account ID as the network device to log in to the communication platform, the network device recognizes that the controller is the device administrator of the network device and allows the controller to perform management operation as the controller connects to the network device with the same login Account ID. It should be particularly noted that the communication platform is not responsible for determining whether the login Account ID that the controller uses belongs to the device administrator identity. The controller is allowed to manage or control the network device as the network device that has logged in to the communication platform discovers that the controller connected therewith uses the same login Account ID to log in. Briefly, the task of the communication platform is only to provide connection between the controller and the network device, while it is the application installed and executed on the controller and the network device to implement the operation method after login.

In the step S18, the controller is allowed to log in as the communication platform identifies that the control application and the login Account ID/password are legal, followed by performing step S19.

In the step S19, the controller that logs in to the communication platform searches for the identification information in compliance with the network device from the communication platform by the login Account ID and the APP ID, acquires the PI connection method of the network device desired to be located, and is capable of connecting therewith, followed by performing step S20.

In the step S20, the communication platform replies the controller with the IP connection method of the network device to be located according to the login Account ID, APP ID and IP connection method published by the network device, followed by performing step S21.

In the step S21, the controller connects to the network device to be located according to the IP connection method replied by the communication platform to control the network device. For example, if the network device is a network camera, the control process executed by the controller belonging to the device administrator identity may include: setting notification of, for example, image event, for the network camera, setting, for the network camera, the geographic information, such as longitude and latitude of the network camera, and the Account ID that could be used to control and access the network camera, and storing the content that the device administrator sets by the set network camera. In addition, the above setting the geographic information of longitude and latitude of the network camera may also be executed in the aforementioned step S12, that is, the controller belonging to the device administrator identity sets the geographic information of longitude and latitude of the connected network device. Correspondingly, in the above step S15, the network device that logs in to the communication platform successfully may not only announce the login Account ID, APP ID and IP connection method on the communication platform, but also announce the geographic information of its longitude and latitude for the controller that logs in to the communication platform to search for the network device to be located according to the geographic information.

The aforementioned whether to access the network camera (not limited thereto, but applied to any network device with networking capability) may have Account ID setting method to be set as access black list or access white list. Specifically, after the controller as the device administrator adds a login Account ID allowing for the use of the network device for the access white list, the controller regarded as the device administrator or the set network device issues a notification message to the controller using the added login Account ID to notify the user of the controller with login Account ID added in the access white list may access the network device.

In detail, the controller with the login Account ID added in the access white list will pop up a pop-up window to notify the user of the login Account ID for the user of the login Account ID added in the access white list to recognize accessible network devices with the notification event. For example, Mr. Peng is the device administrator of the network printer in a company. Mr. Peng added Miss Lin's Account ID (i.e., the login Account ID to log in to the communication platform) in the access white list of the network printer through his mobile (i.e., a controller on which the control application is installed and executed). The mobile or the network printer issues immediately a notice to the controller that uses the Account ID issued to Miss Lin to log in the communication platform. A notice message pops up on the controller that Miss Lin uses to notify Miss Lin that she with network printers available for her. Miss Lin clicks the notice message to connect the controllers and network printers she uses. Or, the controller that Miss Lin uses stores the login Account of the network printer prepared for future use. In addition, the message pop-up method on the controller that Miss Lin uses is to: search for and acquire the IP connection method corresponding to the Account ID of Miss Lin that allows for the access of the network printer, to issue the notification message to the controller using Miss Lin's Account ID according to the IP connection method. An example of a conventional setting notice is that: Mr. Peng calls, via phone, or emails to notify Miss Lin, Miss Lin enters manually the Account ID of the network printer on the controller she uses. Therefore, in comparison to the conventional method, the invention simplifies significantly the problem to spend time and efforts in conventional setting notification.

Moreover, the aforementioned Account ID is the login Account ID used to log in the communication platform, while the login Account ID may also adopt the existent Email data format. If the aforementioned access black list and access white list are set with such data format, the control application of the controller provides a "Function Variable Name" setting. That is, it depends on the function variable name entered behind the symbol @ to determine whether to provide the access function. For example, @hotmail.com, @gmail.com, or @hotmail.com is the function variable name. It indicates that all login Account IDs with the function variable are allowable for or prohibited from accessing to the network camera. That is, there is the function to identify the mail box host name. Additionally, if the data format of the existent Email data format is used to register a new login Account ID to the communication platform, the communication platform will issue a confirmation mail to the mail address that is used to register the login Account ID with the Email data format. If the Email address owner accepts the confirmation mail and click the confirmation, the communication platform will record that this login Account ID is confirmed to identify that the registrant owns this Email address.

In more detail, as a certain mail box host name is used as a white list configuration, the network device will check the login Account ID using the mail box host name. the network device may only be used as long as the login Account ID is confirmed via mail. The intension is to prohibit stealing the use of the host name. For example, the mail box host name, @ibm.com, is used as a login Account ID to use the network device. Then, if a client registers arbitrarily a new account, xxx@ibm.com (available as long as no any name is registered), followed by connecting to the network device, the network device will query the communication platform whether this Account ID has passed mail confirmation. The network device will reject the Account ID to connect and use the equipment if the communication platform has not yet made confirmation.

From above, the above communication platform confirmation procedure may use the mail box host name for security with respect to access white list. The login Account ID belonging to the mail box host name should pass confirmation before being allowed to use the network device.

In addition, as the controller belonging to the device administrator identity set the access white list for the network camera, the control application of the controller further provides an option setting of "Allow Use in Local Area Network". If the device administrator sets the "Allow Use in Local Area Network" for the network camera, for any controller that can connect to the local area network, for example, local area networks in exhibit, company restaurant, house etc., that searches for and connects to the network device (wherein, it may perform searching through the communication platform or by the controller provided by the network device), the network device discovers that the controller connects directly to the network device through the local area network, the network device will allow the controller to use the network device without being constrained to the access white list of the network device. Thus, it is convenient for an unspecific user to use the network device. For example, there are many network cameras in an exhibit. Those network cameras login to the communication platform, respectively and all of them have "Allow Use in Local Area Network". Therefore, for any person in the exhibit, as long as the person may make the controller to connect to the local area network in the exhibit, in spite of whether the communication platform has been logged in, as long as the command of "Search Local Area Network Device" is executed on the controller (for example, by pressing a certain button on the controller), all network cameras in the local area network of the exhibit may be found out automatically because these network cameras have "Allow Use in Local Area Network" configured. The controller may use these network cameras immediately in spite of whether the network camera has set an access white list or not, or whether a certain login Account ID is allowed to use or not. Of course, as the user leaves the exhibit, the network cameras in the exhibit may not be watched because it is incapable of connecting the local area network of the exhibit, unless these network cameras allow the login Account ID of the controller to watch.

Figure 3:
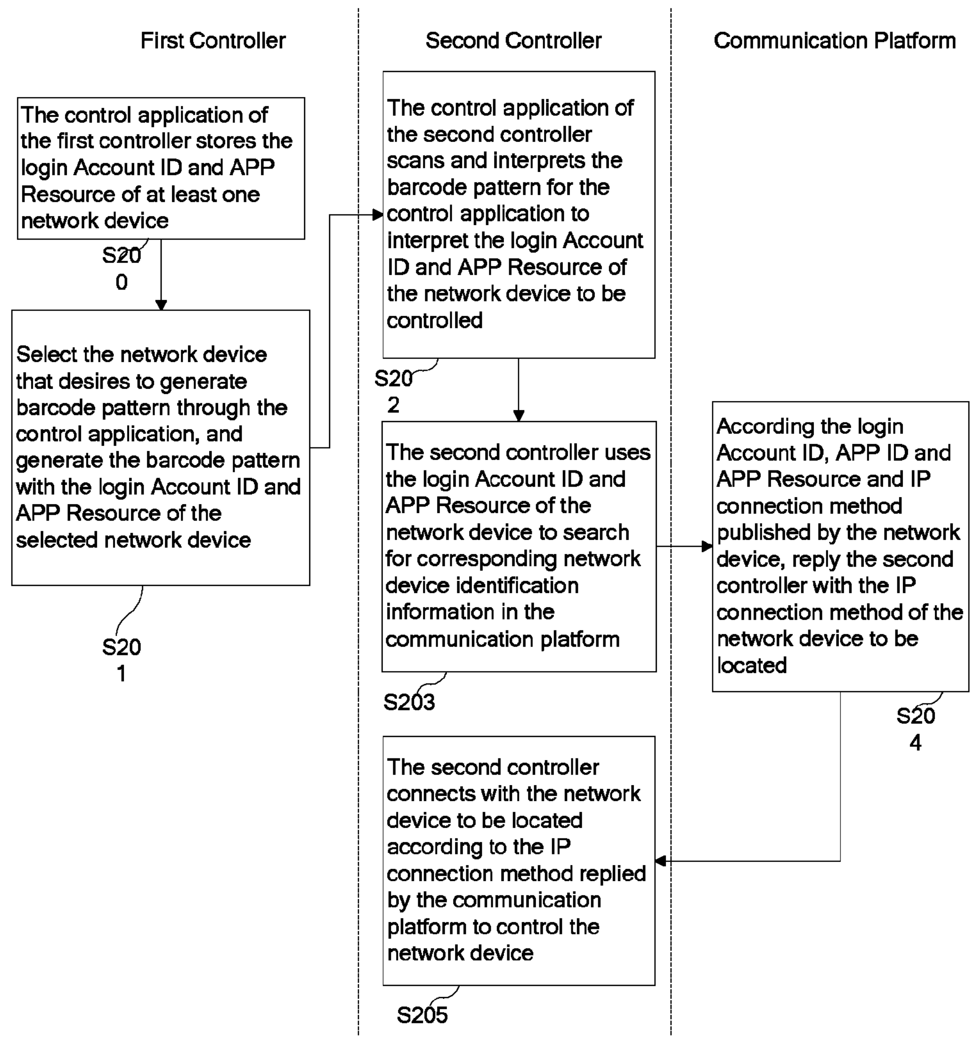
FIG. 3 is a method flow chart showing the quick connection with a network device according to the invention.

From above, under the interaction of the applications installed and executed respectively on the controller and the network device, the controller may connect with the network device through the communication platform such that it is available to perform control setting for the network device. Compared to current setting methods, the method is comparably convenient. Besides, for the controller to connect with the network device more quickly, as shown in FIG. 3, which is a method flow chart showing the quick connection with a network device according to the invention, it is noted that, to all controllers that desire to connect with the network device through the communication platform should all install and execute the aforementioned control application, and should all have logged in to the communication platform in advance. In the example, two controllers are stated as an example, but the number is not limited thereto, and more controllers are possible. The two controllers are divided into a first controller and a second controller. The first controller records the login Account ID and/or the APP Resource of one or more network devices that have been ever connected and used. At first, step S200 is performed. An application of the first controller stores login Account IDs and APP Resources of one or more network devices, followed by performing step S201. In addition, in the step that the controller sets parameters for the connected network device stated in the above step S12, the controller may further set APP Resources for the network device. For example, if the user of the controller desires to configure the network device as a network camera, and configure multiple that kind of network cameras in doors, elevators, ladder spaces on partial important floors of a community building, the user may designate to use the same login Account ID/password for the multiple network cameras through the controller and set different APP Resources, respectively. For example, the APP Resource of one certain network camera may be set as door, and that of another network camera may be set as ladder space. Therefore, the controller may control or monitor multiple network devices with a single login Account ID, and select the network devices to be controlled according to different APP Resources. Therefore, the communication platform builds identification information of the network device with login Account ID, APP ID, APP Resource and IP connection method of the network device. Moreover, from above, the barcode pattern generated by the first control is not limited to the login Account ID and the APP Resource, it is possible to be only the login Account ID, while the example uses login Account ID and APP Resource as example.

It is noted particularly that any controller will remember its own login Account ID and/or APP Resource of the network device, and login Account IDs and/or APP Resources of network devices it has ever connected with, or the user of the controller may designate the login Account ID and/or APP Resource of the network device to be remembered in "My Favorite" list in the control application of the controller. In the step S201, the first controller uses the login Account ID and the APP Resource of a certain network device selected by the client through the control application to generate and display the barcode pattern, followed by performing step S202.

In the step S202, the control application of the second controller scans the barcode pattern displayed by the first controller, while the control application of the second controller interprets the login APP ID and the APP Resource of the network device to be connected, followed by performing step S203.

In the step S203, the second controller searches for the identification information of the network device corresponding to the login Account ID and the APP Resource of the network device from the communication platform, followed by performing step S204.

In the step S204, the communication platform replies the second controller with the IP connection method of the network device to be located according to the login Account ID, APP ID, APP Resource and IP connection method published by the network device, followed by performing step S205.

In the step S205, the second controller connects with the network device to be located according to the IP connection method replied by the communication platform to control the network device.

In addition, the first controller in performing above steps S200 and S201 may run without logging in to the communication platform, and the second controller in performing above step S202 may also run without logging in to the communication platform. In other words, the controller that does not have to connect with the network device may run in off-line status to generate or scan the barcode pattern. Of course, in the off-line status, the second controller may only store the login Account ID acquired by scanning the barcode pattern for future use.

Therefore, the method for quick connection with network device according to the invention is to record login Account IDs and/or APP Resources of one or more network devices on a controller. The user of a controller may tap a physical or virtual key for the control application to generate a barcode pattern with the login Account ID and/or APP Resource selected by the client for the user of another controller to scan. For example, said another controller may connect with the network device directly by pressing the physical or virtual key on said another controller without entering a series of message for login manually to simply considerably an input program. Also, it provides convenient input operation for older people or children, who have difficulty in input operation, and thereby reduces the difficulty of connection operation for network devices.

Figure 4:
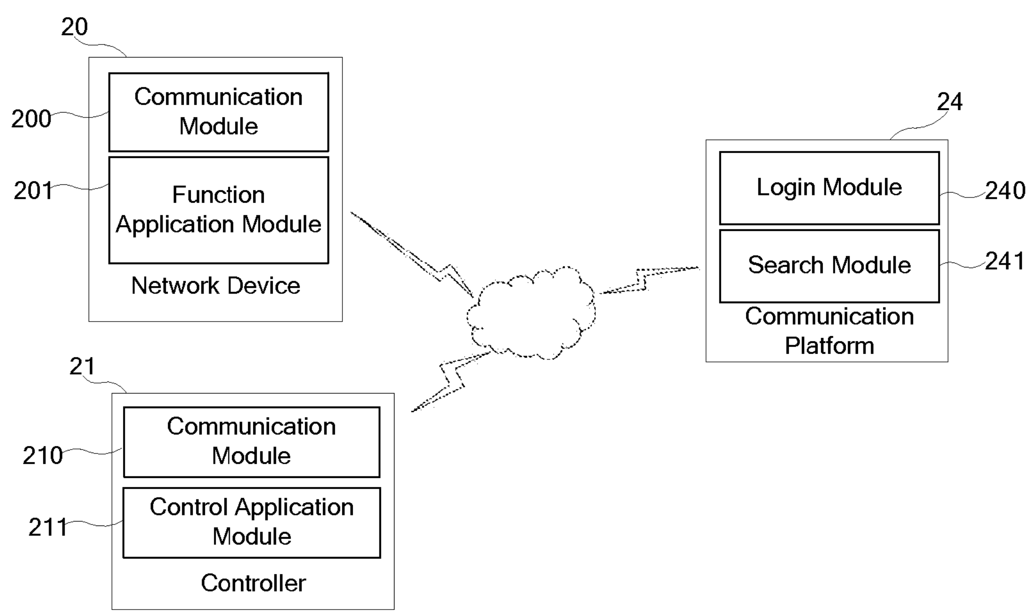
FIG. 4 shows a controller implementing the method in FIG. 3 and a fundamental structure block diagram of the controller, a communication platform and a network device.

To implement the method for quick connection with network device illustrated above in FIG. 3, the invention may further provides a controller, as shown in FIG. 4, which shows a basic architecture block diagram of a controller, a network device and a communication platform implementing the method for quick connection with and the network device. The network device 20 may include at least a communication module 200 and a function application module 201. The controller 21 of the invention includes at least a communication module 210 and a control application module 211. The communication platform 24 includes a login module 240 and a search module 241. It is noted that, to simplify drawing and description, only function modules related to major features of the invention are stated below, and the descriptions for other function modules, for example, power module etc., will be omitted.

The communication module 200 of the network device 20 is used to connect with the communication module 210 of the controller 21, and the communication module 200 and the communication module 210 support wired or wireless connection for the network device 20 that cannot connect to network to connect with the controller 21, such that the step S13 of FIG. 2 that the setting parameters of the controller 21 are received is performed to connect with the communication platform 24 in internet fashion and become a service unit of the communication platform 24.

The login module 240 of the communication platform 34 builds, for the controller 21, controller identification information, including the login Account ID thereof and the APP ID of the control application module 211, and also records the APP ID (application identifier) of the function application module 201 of the network device 20. After the network device 20 becomes the service unit, the communication platform 24 will record identification information, including the login Account ID of the network device 20, the APP ID thereof and the IP connection method thereof. As above, depending on different application requirements, the communication platform 24 will record identification information of the network device 20, including login Account ID, APP ID, APP Resource, geographic information and IP connection method thereof.

Besides, for making any hardware unit that logs in to the communication platform 24 in compliance with authorization qualification to improve network security of communication platform, the login module 240 may also have identifier of authorized controller and/or network device recorded in advance, to permit the controller and/or network device to log in successfully after it is confirmed that the identifier of the controller and/or the network device has been authorized. The identifier described above may be a hardware identifier or a product serial number, and any identifier that may identify the uniqueness of the network device and/or controller is applicable.

After the network device 20 becomes a service unit of the communication platform 24, the search module 241 of the communication platform 24 searches for the connection method using the login Account ID to log in the network device 20 according to the login Account ID/APP Resource entered by the controller 21, and provides the IP connection method found out to the controller 21, for the controller 21 to connect with the network device 20 to be controlled according to the IP connection method and control the network device 20.

From above, besides of having the function to make the network device 20 that cannot connect to network to become a service unit of the communication platform 24 and control the network device 20 that logs in to the communication platform 24, the control application module 211 of the controller 21 further provides the function to generate barcode pattern, scan barcode pattern and search for network devices on map. To be detailed, the function of generating barcode pattern stated above indicates that the barcode pattern is generated and output or stored according to login Account IDs and/or APP Resources used for one or more network devices to log in to the communication platform, for other controllers to scan the barcode pattern and for said other controllers to connect with the network equipment corresponding to the barcode pattern quickly and conveniently. The aforementioned barcode pattern is, for example, displayed on the screen of the controller, printed out, uploaded to cloud, sent to external storage unit, or stored in local storage unit etc. The aforementioned function of scanning the barcode pattern indicates to scan directly the generated barcode pattern to locate the network device to be connected according to the scanned and interpreted login Account ID and/or APP Resource after logging in to the communication platform. The aforementioned function of searching for network devices on the map indicates that the map information of the geographic information announcing the network device may be displayed on the screen of the controller 21, for the user of the controller 21 to select directly the network device to be controlled on the map information.

From above, for the method for quick connection with network device and the controller of the invention, it utilizes scanned barcode pattern to replace conventional code as input for a login Account ID, and the controller belonging to device administrator (or device owner) identity may have its own network device logging in to the login Account ID and/or APP Resource of the communication platform, or, an user of any controller may have his/her own network device that has ever been connected or recorded to log in to the login Account ID and/or APP Resource of the communication platform, to generate corresponding barcode pattern, for another controller that has connection requirement to scan. Compared to current connection method, the method of the invention is relatively convenient. Additionally, the controller belonging to device administrator identity may further set access Account ID of the network device as settings of access black list, access white list, and "Function Variable Name", and even provide the setting of "Allow Use in Local Area Network", o improve the setting flexibility of the network device on access authority.

What is claimed is:

1. A method for quick connection with network device, which connects a controller and the network device through a communication platform, and the communication platform records controller identification information and network device identification information for controller and network device that logs in successfully; the controller identification information includes a login Account ID used to log in to the communication platform, APP ID of control application installed and executed on the controller, and IP connection method; the network device identification information includes a login Account ID used to log in to the communication platform, APP ID of function application installed and executed on the network device, and IP connection method; the method for quick connection with network device includes the following procedures:

selecting, by control application of controller, at least one login Account ID for generating barcode pattern from the recorded login Account ID of at least one of the network devices to generate barcode pattern corresponding to the selected at least one login Account ID;

scanning, by control application of another controller, the generated barcode pattern, for the control application of the another controller to interpret the login Account ID of the network device to be connected;

searching, by the control application of the another controller, for corresponding identification information of network device with the interpreted login Account ID of the network device from the communication platform;

replying, by the communication platform, the another controller with the IP connection method of the network device to be connected according to the found identification information of the network device; and connecting, by the another controller, with the network device desired to be connected, according to the IP connection method replied by the communication platform.

2. The method for quick connection with network device as claimed in claim 1, wherein, before the another controller connects with the network device, the another controller performs the following procedure:

executing, by the another controller, the control application and logging in to the communication platform with the login APP ID/password thereof; and recognizing, by the communication platform, that the login Account ID/password used by the another controller and the APP ID of the control application executed thereby has legitimacy and allowing the another controller to log in.

3. The method for quick connection with network device as claimed in claim 1, wherein, after the another controller connects with the network device through the communication platform, the another controller and the network device communicate and operate mutually and directly through the control application and function application installed thereon, respectively.

4. The method for quick connection with network device as claimed in claim 1, wherein, the network device is set by a controller with device administrator identity to successfully configure the network device as a service unit of the communication platform, and after the controller with the device administrator identity connects with the network device, the control operations performed by the controller with the device administrator identity for the network device includes: whether access of the Account ID setting of the network device is allowed, or whether the use of the setting of the network device in local area network is allowed.

5. The method for quick connection with network device as claimed in claim 4, wherein, the controller with device administrator identity or the configured network device searches and acquires IP connection method corresponding to the Account ID that has been granted access to the network device on the communication platform, and issues one notice to the Account ID that has been granted access to the network device according to the IP connection method.

6. The method for quick connection with network device as claimed in claim 4, wherein, the Account ID with respect to whether to access the network device is the login Account ID for logging in to the communication platform, and when the login Account ID employs the form of Email address, the control application of the controller provides the setting function of mail box host name, to differentiate mail box host names with respect to granting or denying access to the network device.

7. The method for quick connection with network device as claimed in claim 6, wherein, as the communication platform receives a message with Email address format to register and apply for a login Account, the communication platform issues a confirmation letter to the Email address for the owner of the Email address to open the confirmation letter and tap to confirm the connection with the communication platform for the login Account ID to become a confirmed Account ID.

8. The method for quick connection with network device as claimed in claim 4, wherein, the login Account ID used by the controller with the device administrator identity is the same as the login Account ID used by the configured network device.

9. The method for quick connection with network device as claimed in claim 1, wherein, the barcode pattern generated by the controller is displayed on local screen, stored in local storage unit, printed out, uploaded to cloud, or sent to external storage unit by the controller.

10. The method for quick connection with network device as claimed in claim 1, wherein, the network device identification information stored by the communication platform further includes APP Resource of the network device; and the message that the control application of the controller desires to perform barcode pattern generation process further includes the APP Resource corresponding to at least one login Account ID.

11. A controller, which is used to log in to a communication platform to connect with at least one network device that has logged in to the communication platform for the controller to interact with at least one network device; the network device has one function application module, and the communication platform stores, for each network device that has logged in successfully, network device identification information, inclusive of login Account ID thereof, APP ID of the function application module and IP connection method thereof; the controller includes:

a communication module, which is used to connect with the network device and/or communication platform; and a control application module, which is used to output login Account ID/password used to log in to the communication platform through the communication module, and performs control process for the network device after connecting the network device, and records the login Account ID used by the network device that has performed control process, and provides selection for recorded login Account IDs of the network devices, and generates barcode pattern corresponding to the login Account ID of the selected network device.

12. The controller as claimed in claim 11, wherein, the control application module further has a function of scanning a barcode pattern to interpret the login Account ID of the network device represented by the barcode pattern, and search for network device identification information corresponding to the login Account ID in the communication platform, to thereby perform connection by IP connection method of the network device acquired by the network device identification information.

13. The controller as claimed in claim 12, wherein, after the controller connects with the network device through the communication platform, the controller and the network device communicate and operate directly and mutually through the control application and the function application installed thereon, respectively.

14. The controller as claimed in claim 11, wherein, as the login Account ID used by the controller is the same as the login Account ID used by the network device, the control process performed by the control application module for the network device includes: whether to allow access to Account ID setting of the network device, or whether to allow the use of the setting of the network device in local area network.

15. The controller as claimed in claim 14, wherein, the controller or the configured network device searches and acquires Account ID that has been granted access to the network device and corresponding IP connection method thereof in the communication platform, and issues a notice to Account ID that has been granted access to the network device according to the IP connection method.

16. The controller as claimed in claim 15, wherein, the Account ID, with respect to whether to grant access to the network device, is the login Account ID that logs in to the communication platform, and when the login Account ID is in the form of Email address data format, the control application module of the controller provides setting setup function for mail box host name to differentiate mail box host names with respect to whether to grant or deny the access to the network device.

17. The controller as claimed in claim 16, wherein, when the communication platform receives a message that registers and applies for a login Account ID with Email address data format, the communication platform issues a confirmation letter to the Email address so that the client of the mailbox can tap to confirm, making the login Account ID becomes a confirmed Account ID.

18. The controller as claimed in claim 11, wherein, the barcode pattern generated by the controller is displayed on local screen, stored in local storage unit, printed out, uploaded to cloud, or sent to external storage unit by the controller.

19. The controller as claimed in claim 11, wherein, the network device identification information stored by the communication platform further includes APP Resource of the network device, and the message on which the control application module of the controller desires to perform barcode pattern generation process further includes APP Resource corresponding to at least one login Account ID.

* * * * *